United States Patent Office 3,560,417
Patented Feb. 2, 1971

3,560,417
OFFSET AND LITHOGRAPHIC PRINTING PROCESS, MATERIAL FOR THE USE IN SAME, AND PROCESS FOR THE PREPARATION THEREOF
Philip A. Pizzi, Berlin, N.J., assignor to Jack P. Randall, Bronxville, N.Y., and Clarence P. Reberkenny, Cherry Hill, N.J., fractional part interest to each
No Drawing. Continuation-in-part of application Ser. No. 727,703, May 8, 1968. This application Mar. 13, 1969, Ser. No. 807,080
Int. Cl. B41n 1/00, 1/08
U.S. Cl. 260—8
17 Claims

ABSTRACT OF THE DISCLOSURE

A printing process including lithographic printing for printing on plastic, paper, metal foil and similar substrates to obtain improved multi-color fidelity is provided by the use of a print-receptive blank comprising a plastic support and a white "blanket" or coating comprising a titanium dioxide pigmented interpolymer of (a) units having carboxylate groups derived from a polymerizable carboxylic acid having $\alpha,\beta$-unsaturation in a vinylidene group (b) units from at least one neutral, free-radical polymerizable ester having a vinylidene group attached to a functional group, and (c) units from at least one neutral, polymerizable monoxinylidene compound, in a formaldehyde stabilized colloid, e.g. gelatin.

Alternatively, a clear backing can be employed by elimination of the above recited pigment. A material for use in such process for producing the same is also provided.

This application is a continuation-in-part of copending application, Ser. No. 727,703, filed May 8, 1968 and now abandoned.

The present invention relates to a blank receptive for printing including among others, lithographic printing, to a coating composition for preparation of such blank, and to a process of preparing such blanks used in the printing of multi-colors upon a support as well as such a printing process for producing multi-color high fidelity prints on plastic, paper, metal foil and other similar substrates. More particularly, the present invention is directed to a method for producing improved fidelity in multi-color offset or lithographic, or similar printing processes, such improved fidelity being associated with the use of a print-receptive sheet or blank, e.g., a plastic sheet having a white or clear "blanket" or coating thereon.

Lithographic or offset printing is widely in use as a modern printing technique. This form of printing is generally practiced by treating a master form so that a first portion thereof is hydrophilic or water receptive and the remaining portion thereof is oleophilic and hydrophobic, i.e., oil receptive and water repellant. In printing, the master is first contacted by water distributing rollers which deposit a film of water on the hydrophilic portion of the master. Ink distributing rollers are then contacted by the master, these rollers distributing an oil-base ink over the master. The ink adheres only on the oleophilic portion thereof since the oil base is repelled by the water film on the hydrophilic first portion of the master. The resulting ink image on the master is then, either directly or through intermediate transfer drums, impressed upon the surface to be printed so that the ink image is transferred thereto to accomplish printing thereof.

In addition to single-color lithographic, multi-color prints have been provided in a number of ways. Generally, multi-color printing has been provided through the use of additional masters, one for each additional color produced, this of course requiring the employment of additional plate rolls, transfer rolls, impression rolls, etc. In addition, recent developments have been provided wherein multi-colored lithographic prints have been prepared from a single master. Such processes involve a sophisticated employment of inks or dyes which alter or change the oleo-hydrophobic character of selected areas of the master. Accordingly, multi-colored lithography is now a conventional means of providing multi-color prints on a variety of blank materials.

While paper has been a conventional medium for the application of lithographic prints, more recently, offset and lithographic printing as well as other printing processes on plastic has become increasingly popular. Such lithographic printing on plastics, however, has created a number of problems. Thus, for example, wherein a lithographic print on plastic is to be employed in display advertising with backlighting, printing on one side of the plastic sheet or blank tends to give only a very weak image. While this problem has been solved somewhat by providing a lithographic print on both sides of the plastic blank or sheet so as to provide a stronger image when backlighted for display and similar purposes, this partial solution to the problem of providing lithographic prints on plastic has provided still further problems. In this respect, it has been found difficult to get good registration for sharpness when printing on both sides of a plastic material. This has been overcome somewhat by printing both sides simultaneously and slipsheeting with paper, but such process requires specialized operations and specialized equipment. Accordingly, this process has not been found to be economically practical, and, in fact, less than 1 percent of the printing houses which provide lithographic prints, and lithographic prints on plasitc in particular, employ this complicated and specialized process. Even with such specialized process, however, the quality of the lithographic or similar print is only fair and the printed image lacks brilliance, density and dimensional quality.

The above deficiencies and disadvantages of previous printing processes, including lithographic processes for providing lithographic prints on plastics have been eliminated in accordance with the present invention by providing a white acrylic blanket on a clear plastic blank or sheet material receptive to the lithographic print. The use of such a sheet material containing a white acrylic blanked is applicable in accordance with the present invention to any and all methods for printing with inks including lithographic and offset printing, letter press printing, silk screen printing, etc., the use of such material being particularly applicable to multi-color lithographic printing. By the use of such a blank or sheet material comprising a clear plastic and a white acrylic blanket thereon, it has been found possible to greatly improve the fidelity and resolution of the various colors printed by multi-color lithographic printing processes. Such improvement in the fidelity of the printed colors is accompanied by an ability of the printed plastic to provide excellent display advertising with backlighting when the lithographic print is applied to only one surface of the plastic material. In this way, a simple and efficient manner of overcoming the difficulties, disadvantages and deficiencies of the prior art has been developed.

Additionally, the present invention relates to an improved color fidelity process for the lithographic printing on paper, metal foils, e.g. aluminum foil and other similar substrates wherein a white or clear blanket is provided on the support material. In this regard, where a support or substrate such as paper is opaque, it is not necessary to provide a pigmented blanket in order to achieve the advantageous lithographic multi-color fidelity process of the present invention.

Accordingly, the present invention comprises an improvement in a multi-color lithographic printing on plastic, paper, metal foils and similar substrates, an improved blank or sheet receptive for a lithographic print, a method for making such improved blank or sheet, and a composition of matter for coating upon the blank or sheet so as to provide an improved material exceptionally useful for receiving a multi-color lithographic print.

Accordingly, it is a principal object of the present invention to provide a lithographic printing process which eliminates the inherent deficiencies and disadvantages associated with prior art processes.

A further object of the present invention is to provide an improved process for the multi-color lithographic printing on plastics, paper, metal foils and similar substrates wherein a lithographic print of improved color fidelity is achieved.

Yet a further object of the present invention is to provide a process for lithographic printing of multi-color prints on plastic wherein a brilliant print with excellent dimensional feeling can be achieved by printing on one side of the plastic material, such print being useful for display advertising with backlighting.

Yet a further object of the present invention is to provide such a process for the multi-color lithographic printing on plastic wherein a white acrylic blanket is provided on a clear plastic support or base, such coated plastic being receptive to the multi-color lithographic print.

A still further object of the present invention comprises an improved lithographic printing process wherein a multi-color print of high fidelity is produced on a plastic paper, metal foil or similar substrate by the use of a white or clear blanket superposed thereon.

A still further object of the present invention is to provide a blank or sheet of plastic material, which blank or sheet of plastic material contains a coating or blanket of white acrylic, such sheet or blank material being receptive to a multi-color lithographic print.

Yet a further object of the present invention is to provide a process for producing such a white acrylic blanket coated plastic material useful and receptive for a multi-color lithographic print as well as coating composition suitably employed to provide the same.

Still further objects and advantages of the process and article of the present invention will become more apparent from the following more detailed description thereof.

In accordance with the present invention, high fidelity, multi-colored, lithographic printing on plastic, paper, metal foils or similar substrates is accomplished by providing such substrate blank or sheet which is receptive to the lithographic print with a blanket or coating of a pigmented or non-pigmented acrylic-gelatin composition so as to provide a blanket or coating upon the substrate. By using such a coated blank or sheet as a receptive medium for the multi-color lithographic print, prints of high color tone, color fidelity, brilliance, etc., are achieved. Particularly, the present invention is directed to the production of multi-color lithographic prints upon a clear plastic support through the use of a white pigmented blanket or coating. The high color fidelity, brilliant prints produced on such a pigmented plastic sheet or blank are very suitably employed in advertising displays with background lighting, in view of the fact that the lithographic print is provided on a substrate which is clear and allows for the passage of light.

The blanket or coating employed upon a plastic blank or sheet in accordance with the present invention is prepared by forming a paste of a white pigment, e.g., titanium dioxide, lithopone, talc, etc., in a dispersion of a water-insoluble interpolymer based upon acrylic acid and its derivatives. Such a dispersion of water-insoluble interpolymer comprises a water-soluble, nonionic surface active agent or emulsifying agent and an interpolymer made up of (a) units having carboxylate groups derived from a polymerizable carboxylic acid having α,β-unsaturation in a vinylidene group, (b) units from at least one neutral, free-radical polymerizable ester having a vinylidene group attached to a functional group, and (c) units from at least one neutral, polymerizable monovinylidene compound. Such dispersions of interpolymers are known in the art as exemplified by U.S. Pat. 2,795,564 to Conn et al.

The polymerizable a,β-unsaturated carboxylic acids of component (a) can comprise such acids as acrylic acid, methacrylic acid, or other alpha-substituted polymerizable acrylic acid or itaconic acid derivatives. The preferred α,β-unsaturated monovinylidene carboxylic acids employed in the production of the interpolymer are methacrylate acid and acrylate acid. In addition, in place of the free acid form of the polymerizable monomer, various water soluble salts including, for example, the ammonium salts and alkali metal salts, e.g., lithium or potassium salts, of the α,β-unsaturated monovinylidene carboxylic acids can be employed. Since it is important that the carboxyl groups enter into the polymerization reaction in the production of the interpolymer, it is preferred that such carboxylate group enter into the copolymer chain by the use of the free acid material.

The component (b) of the interpolymer, i.e. at least one neutral, free radical, polymerizable ester having a vinylidene group attached to the functional group, is generally one which when polymerized by itself yields a soft polymer. Such monomers are neutral compounds which form a separate phase with the aqueous solutions used in forming the dispersions, which contain per molecule one vinylidene group attached to a functional substituent or an activating substituent with a double bond, which polymerize through the vinylidene group with the acid of a free radical catalyst, and which yield solid polymers having a Ti value below 15°–20° C. The useful monomers which yield hard polymers by themselves are identifiable in the same general terms except they have a Ti value above 15°–20° C.

The Ti value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The Ti value here used is that determined at 300 kg./cm.$_2$.

As polymerizable, neutral, monomeric monovinylidene esters which form soft, solid polymers in the presence of peroxide catalysts, there may be used any primary and secondary alkyl acrylate, even with alkyl substituents up to eighteen or more carbon atoms, primary or secondary alkyl methacrylates with alkyl substituents of five to eighteen or more carbon atoms, or other monovinylidene compounds as defined above which are polymerizable below 80° C. with free radical catalysts to form soft solid polymers. Ionically polymerizable compounds are not within the scope of this class of compounds. The preferred monovinylidene compounds are the stated acrylates and methacrylates and of these the most practical esters are those with alkyl groups of not over 12 carbon atoms.

The preferred monomers which by themselves yield soft polymers may be summarized by the formula

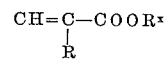

where R is hydrogen or the methyl group and $R^x$ represents, when R is methyl, a primary or secondary alkyl group of 5 to 18 carbon atoms, or, when R is hydrogen, an alkyl group of not over 18 carbon atoms, or better, of two to 12 carbon atoms.

Typical cmpounds coming within the above definition are methyl acrylate, ethyl acrylate, propyl acrylate, isopropyl acrylate, butyl acrylate, isobutyl acrylate, secbutyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 2,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

The component (c) of the interpolymer which comprises at least one neutral polymerizable monovinylidene compound is generally one which when polymerized by itself yields a hard polymer. Such polymerizable monovinylidene monomers include, for example, alkyl methacrylates having alkyl groups of not over four carbon atoms, tert.-amyl methacrylate, tert.-butyl or tert.-amyl acrylate, cyclohexyl acrylate or methacrylate acrylonitrile, or methacrylonitrile.

The above monomers yield polymers under the influence of free radical catalysts, particularly peroxidic catalysts, which polymers are generally regarded as hard. These polymers, when free of any appreciable content of monomer, have Ti values above about 20° C. Hard polymers have also been defined as those having softening points above 55° C. or brittle points above about 5° C. These are all different appraisals of the force required to produce a given deformation in a body in a given time and to evaluate the aggregation of various properties encompassed within the term of hardness.

Preferred monomers which by themselves form hard polymers may be summarized by the formula.

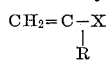

wherein R is a hydrogen or the methyl group and wherein X represents one of the groups —CN, and ester-forming groups —COOR′, wherein R′ is cyclohexyl or, when R is hydrogen, a tert.-alkyl group of four to five carbon atoms, or, when R is methyl, an alkyl group of one to four carbon atoms. Some typical examples of these have already been named. Other specific compounds are methyl methacrylate, ethyl methacrylate, propyl methacrylate, isopropyl methacrylate, butyl methacrylate, sec.-butyl methacrylate, and tert.-butyl methacrylate.

Generally, the $\alpha,\beta$-unsaturated carboxylic acid or salt thereof is interpolymerized in a proportion usually between about 0.5 percent and 2.5 percent by weight, preferably between 0.8 percent and 2 percent with the ratio of the component (b) to component (c) being from about 9:1 to 1:20. Of course, these ranges are only exemplary and can be varied considerably, the ratio of components (b) and (c) being selected with respect to the degree of softness or hardness required for the resultant interpolymer.

Some typical proportions which provide a desired balance of properties in films of the interpolymers which include 0.5 to 2.5% of a defined acid are as follows, these being by weight: ethyl acrylate-methyl methacrylate, 6:4 to 7:3, ethyl acrylate-styrene, 4:1 to 7:3, ethyl acrylate-acrylonitrile, 4:1 to 3:1; propyl acrylate-acrylonitrile 7:3 to 3:1; isopropyl acrylate-acrylonitrile, 9:1 to 5:1; isopropyl acrylate-methyl methacrylate 6:1 to 4:1; propyl acrylate-methyl methacrylate, 1:1, 2:3; butyl acrylate-acrylonitrile, 7:3 to 3:2; butyl acrylate-methyl methacrylate, about 1:1; isobutyl acrylate acrylonitrile 4:1 to 7:3; isobutyl acrylate-methyl methacrylate 3:2 to 1:1; sec.-butyl acrylate-acrylonitrile, 5:1 to 4:1; sec.-butyl acrylate-methyl methacrylate, 7:3 to 3:2; 2-ethyl hexyl acrylate-styrene, 1:1 to 2:3; 2-ethylhexyl acrylate-acrylonitrile 2:1 to 3:2; 2-ethylhexyl acrylate-methyl methacrylate 1:1 to 2:3; 2-ethylhexyl acrylate-butyl methacrylate, 1:9 to 1:20; 2-ethylhexyl acrylate-isobutyl methacrylate, 3:7 to 1:4; ethyl acrylate tert.-butyl methacrylate, 9:1 to 5:1; dodecyl acrylate-methyl methacrylate 2:3 to 1:3; hexyl methacrylate-butyl methacrylate, 1:1, etc. It will be seen that to provide useful interpolymers the outside proportions of monomers forming soft polymers to monomers forming hard plymers vary from about 9:1 to about 1:20. In every case, of course, the ultimate interpolymer will be formed with about 0.5% to about 2.5% of a defined carboxylate. For the preferred situation in which the interpolymer is prepared from an ester of acrylic acid and a non-tertiary alkanol of not over 12 carbon atoms and methyl methacrylate (together with acid), the ratios vary from about 6:1 to 1:3. These ratios are also preferred for other acrylic materials.

All of the above interpolymers are described in detail in U.S. Pat. 2,795,564, which patent describes the preparation of such interpolymer materials falling within the generic description set forth above.

The emulsifiers or surface-active agents employed in accordance with the present iivention to provide the dispersion of the interpolymers set forth are of the nonionic type. Such nonionic surface active agents or emulsifiers contain both a hydrophobic or hydrocarbon portion and a hydrophilic portion. The latter is a polyether chain usually terminated with an alcoholic hydroxyl group. This is of sufficient size to render the agents water-soluble. For combinations of monomers in which polar groups form a relatively good proportion it is preferred that the nonionic agents have 20 to 50 ether groups in the hydrophilic portion. When the combination of polymerizable monomers has a relatively high hydrocarbon content, best results are usually had with nonionic agents having a relatively small proportion of ether groups. These principles will guide the selection of the most effective emulsifiers for the particular monomers chosen for the preparation of suspensions of resulting interpolymers.

Typical emulsifiers which may be used include alkyl-phenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkythiophenols having alkyl groups of six to fifteen carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight.

Exemplary dispersions of interpolymers such as utilized in accordance with the present invention are commercially sold under various trade names, such as Rhoplex by Rohm and Haas Company.

As indicated previously, in accordance with the above described embodiment of the present invention, a paste is produced by grinding together enough white pigment, e..g titanium dioxide, barium sulfate, talc, etc., with the dispersion of interpolymer so as to provide a paste which can be measured in liquid form for subsequent mixing with the other components of the coating composition utilized to provide the white blanket or coating layer on the plastic blank or sheet. Generally, the white pigment, e.g. titanium dioxide, will comprise from about 10% to about 80% by weight of the prepared paste.

The paste produced as above is then mixed thoroughly with a copolymer of a lower acrylic ester and vinyl ester.

Such liquid copolymers are well known in the art and any of such copolymers can be employed here. The lower acrylic esters which are employed as one component include, for example, the methyl, ethyl, n-propyl, isopropyl, n-butyl, t-butyl esters of acrylic and methacrylic acid. Similarly, suitable vinyl esters include, for example, vinyl acetate, vinyl propionate, vinyl butyrate, vinyl isobutyrate, as well as the vinyl esters of higher fatty acids, e.g. vinyl stearate, aromatic acids, e.g. vinyl benzoate, and unsaturated monocarboxylic acids, e.g. vinyl acrylate, vinyl methacrylate, etc. Of these, the vinyl esters of the lower aliphatic monocarboxylic are preferred. Additionally, a further amount of interpolymer dispersion can also be mixed with the paste of white pigment and interpolymer dispersion and copolymer of lower acrylic ester/vinyl ester to prepare an intermixing composition for addition to gelatin or similar water permeable colloid, e.g. various gelatin substitutes so as to produce the final composition for coating upon the clear plastic blank or sheet so as to provide the white acrylic "blanket."

While any and all of the interpolymer dispersions described above can be added to the titanium dioxide-interpolymer dispersion paste and copolymer of the lower acrylic ester/vinyl ester, the preferred interpolymers are those which employ as component (a) acrylic acid or methacrylic acid; as component (b) an ester of acrylic acid which by itself forms a soft polymer; and as component (c), esters of methacrylic acid which by themselves form hard polymers, acrylonitrile or methacrylonitrile.

In preparing this intermix formula, the titanium dioxide-interpolymer dispersion paste is generally employed in an amount of from 25 to 50% by weight, the acrylic ester/vinyl ester copolymer in an amount from 20 to 75% by weight and the further interpolymer dispersion in an amount of from 0 to 40% by weight. Preferably, such components are employed in amounts of from 30 to 40% by weight, 40 to 50% by weight and 20 to 30% by weight respectively.

The final coating composition in the preparation of the acrylic blanket is obtained by mixing such intermix formula with a gelatin or a similar colloid dispersion. In place of gelatin, various gelatin substitutes, e.g. other water permeable colloids, for example, albumin, casein, polyvinylalcohol, etc., can be utilized, the dispersion of such colloid generally being stabilized or hardened by the minor amount of formaldehyde or similar conventional material. Generally, the intermix formula is added to the gelatin dispersion so as to prepare a final coating composition comprising 20 to 70% water, 2 to 20% gelatin or similar colloid and 25 to 50% of the intermix formula. As stated above, generally a minor amount of stabilizing agent, or hardening agent, e.g. formaldehyde, in an amount of from about 0.0005 to 0.02% by weight is included. Preferably, however, the final coating composition comprises 40 to 60% water, 5 to 10% gelatin or similar colloid, 30 to 40% of the intermix formula and 0.001–0.5% formaldehyde.

The coating composition prepared in the manner described above is coated upon the plastic substrate which can comprise any conventionally employed plastic material. In this respect, it has been found that the acrylic blanket or coating employed in accordance with the present invention adheres readily to all plastic surfaces. Thus, for example, the plastic support or blank can comprise polystyrene, polyolefins such as polyethylene and polypropylene, polyvinylacetate, polyesters such as polyethylene terephthalate, Mylar, etc. Of such plastics, polystyrene is preferred because of its ready availability and low cost.

While the above discussion has been based primarily upon the advantages associated with the employment of a pigmented blanket or coating in accordance with the present invention, it should also be made clear that in accordance with a further embodiment of the present invention a clear or non-pigmented blanket or coating can be applied to a suitable substrate, i.e., plastic, paper, metal foil, etc., in order to provide a base upon which the lithographic printing process can be conducted.

In utilizing the clear or non-pigmented blanket or coating, a similar procedure as set forth above is used. In this regard, instead of forming a paste from the pigment and water-insoluble interpolymer based upon acrylic acid and its derivatives the interpolymer itself, non-pigmented, as a dispersion with a water-soluble nonionic surface active agent is mixed with a copolymer of a lower acrylic acid ester and vinyl ester to form the so called intermix composition. As indicated above, with respect to the formation of the pigmented blanket or coating, such intermix composition can be further mixed with a still further amount of interpolymer dispersion and this composition is added to gelatin or a similar water permeable colloid to provide the desired composition for application to the suitable substrate to produce the necessary blanket or coating. In the case described above wherein pigment is not employed, the coating or blanket which is applied will be clear but as was the case with the pigmented coating will be extremely receptive to multi-color lithographic printing.

It is pointed out here that all of the preferred material set forth above with regard to the composition utilized in preparing the pigmented blanket or coating are similarly preferred in accordance with this embodiment of the present invention wherein a non-pigmented, clear coating is produced and applied to a suitable substrate for receipt of the multi-color lithographic print.

It is also pointed out that as was the case with regard to the formation of the pigmented composition for production of the blanket or coating on the plastic or similar substrate, the use of a minor amount of a hardener, e.g., formaldehyde, in conjunction with gelatin or similar water permeable colloid, is preferred in accordance with the present invention. With regard to the production of the clear or non-pigmented coating or blanket it is preferred that the various components are mixed so that the final coating composition comprises from 25 to 75% by weight water, 13 to 60% by weight of the water-insoluble interpolymer dispersion, 6 to 25% by weight of the acrylic acid/vinyl ester copolymer, 2 to 15% by weight gelatin and .001–2% by weight hardener.

As can be seen from the above, the intermix formula comprising the interpolymer dispersion and acrylic acid/vinyl ester copolymer, comprises from about 45 to about 98% by weight of the total coating composition, the remainder being made up of the water permeable colloid and hardener for the same. Such intermix composition is prepared in accordance with the present invention by the admixture of from about 25 to 50% by weight of the interpolymer dispersion and 20 to 75% by weight of the acrylic ester/vinyl ester copolymer. As indicated previously, with regard to the preparation of the pigmented blanket or coating, the final composition including the final amount of interpolymer dispersion is provided by the further addition of from 0 to 40% by weight preferably 20 to 30% by weight of further interpolymer to the intermix formula or composition.

As indicated previously, in addition to the advantages associated with the application of the coating or blanket to a clear plastic substrate, it is possible to apply with the pigmented or non-pigmented composition to coat suitable substrates including papers, metal foils, e.g., aluminum foil etc. Particularly with regard to the utilization of paper and metal foils as a suitable substrate in accordance with the present invention, the use of the clear or non-pigmented coating or blanket has exceptional utility since the substrate itself provides a sufficient degree of opacity as to bring about the desired contrast in multi-color lithographic print. It is pointed out however, that the use of clear or non-pigmented coating or blanket upon a clear plastic support is similarly advantageous in that it provides for exceptional see through advertising displays having a brilliant multi-color lithographic print thereon.

With regard to the various types of substrates that can be advantageously utilized in accordance with the present invention, it is pointed out that with paper for example, it may be advantageous to increase the acrylic ester/vinyl ester copolymer and increase the gelatin or similar water permeable colloid amounts while still operating within the ranges set forth above. This provides for a high gloss effect on paper, a similar effect being achieved by a concurrent decrease or elimination of the pigment content of the composition.

Similarly, for example, to produce a matt finish on paper, it is sometimes advantageous to employ a higher amount of pigment mixture, i.e., within the upper range as specified above with a concurrent decrease in the amount of acrylic ester/vinyl ester copolymer i.e., to within or near the lower end of the range previously specified. It is pointed out with regard to all of the above variables however, that by operating within the ranges set forth above, both with regard to the preparation of a pigmented or non-pigmented coating or blanket and the use of the various substrates described, that brilliant multi-color high fidelity lithographic prints can be obtained by conducting a process and utilizing a composition within the parameters previously described.

With regard to the substrate, again it is pointed out that any type of paper or metal foil, e.g., aluminum foil, tin foil, etc. or plastic can be used as long as the same is receptive to the coating or blanket applied in accordance with the present invention. In this regard, the process of the present invention as well as the compositions employed therein are not limited or confined to the use of any particular type of substrate.

The coating composition employed in accordance with the present invention is applied to the suitable support or blank in any conventional way, e.g., from a dipping pan, by roller application, brush application, or spray when the composition is not excessively thick.

The acrylic blanket or coating can be applied to the support or blank in any thickness desired varying from a very thin coating just sufficient to provide the white or clear background upon which the lithographic print is made, to a coating of sufficient thickness that can be stripped from the plastic support or blank after production of the lithographic print and provide a self-sustaining product. In this respect, the lithographic print applied to the acrylic blanket face of the plastic support can be employed as such for advertising displays, etc., wherein backlighting is utilized, or the acrylic blanket containing the lithographic print can be stripped from the plastic backing to provide a self-supporting material having a variety of uses. Thus, such material can be used for packaging, or can be used for such decorative and functional purposes as placement, etc.

In addition, where special effects are required or desired for particular purposes, it is possible to employ a colored backing, i.e., colored plastic, instead of the clear plastic backing or support previously mentioned. This will therefore provide an overall tint or hue when viewed for advertising purposes with backlighting.

In addition, as pointed out above, the coated blank or sheet material of the present invention can be applicably employed in any and all lithographic and offset printing processes in addition to other processes involving printing with ink.

With respect to lithographic and offset printing, since the improvement in the fidelity of the lithographic print, ease of printing, etc., is associated not with the apparatus employed in making the lithographic print or in the lithographic process per se, but rather in the sheet material receptive for such lithographic print. In this regard, the improved blank or sheet containing the white acrylic coating or clear acrylic coating in accordance with the present invention can be employed in any conventional lithographic process involving any conventional lithographic apparatus. While the present invention is particularly applicable in providing sharp, clear, realistic, dimensional, multi-color lithographic prints upon a suitable support, the present invention is also applicable to single-color lithography. Thus, the present invention is particularly applicable to the newly developed multi-color lithographic processes and apparatus which allow for the preparation of lithographic prints containing up to five separate colors from a single apparatus and process. In fact, in accordance with the process of the present invention, lithographic prints are produced which have brilliance, fidelity, and dimensional characteristics superior to conventional lithographic prints now only producible on paper. In addition, the use of a clear plastic support allows for the preparation of a lithographic print which can be employed with backlighting for advertising display purposes. With respect to such backlighting advertising display, the present invention comprises an improvement over conventional lithographic printing by providing a simple and effective means for creating a clear, realistic print with excellent fidelity and dimensional characteristics by printing only on one side of the plastic support.

The composition, product and process of the present invention will now be further described by reference to the following specific examples.

EXAMPLE I

Titanium dioxide powder was mixed and ground with 4000 cc. of an interpolymer dispersion prepared by polymerizing 280 parts of ethylacrylate, 140 parts of methylmethacrylate, and 5.5 parts of methacrylic acid in a solution of 25 parts of an octylphenoxypolyethyoxethanol having about 30 ether groups in 1000 parts of water. The dispersion to which the titanium dioxide was added contained approximately 46% solids. Sufficient titanium dioxide was mixed and ground with such dispersion so as to form a paste that could be measured as a liquid.

Then, 960 cc. of the paste produced as above were mixed with 1280 cc. of a lower acrylic ester/vinyl ester copolymer (Rhoplex W-80)[1] and 640 cc. of an interpolymer dispersion (Rhoplex B-15)[2] comprising a nonionic surface active agent and an interpolymer of methacrylate acid, methacrylate, and methylmethacrylate to form an intermix formula.

A gelatin emulsion was prepared by mixing 3840 cc. of water and 256 g. of gelatin, the gelatin being mixed with the cold water and allowed to expand for one-half hour. The gelatin emulsion was then heated to 140° F. with cooling to 110° F. and subsequent mixing with such emulsion, 1920 cc. of the intermix formula as prepared above. In addition, 16 cc. of a 40% formaldehyde solution were added and the system mixed well and heated again at 110° F. After filtering the composition with a fine filter cloth, the composition that was prepared was ready for coating onto a plastic support or base to provide a lithographic print receptive surface.

EXAMPLE II

A composition was prepared as in Example I except that the final composition was obtained by intermixing

---

[1] Rhoplex WN-80 is a non-ionic, acrylic resin emulsion, demonstrating high stability under mechanical pressure and excellent tolerance for a variety of inorganic salts.
[2] Rhoplex B-15 is a latex consisting of 46% by weight of an aqueous dispersion of a relatively soft reactive acrylic terpolymer which is predominantly ethylacrylate, containing minor amounts of methylacrylate and acrylic acid. The molecular weight of the polymer is greater than $2 \times 10^6$. The pH value of this latex is 6.02–6.08. Note U.S. Pats. 2,989,423 and 3,249,463.

1600 cc. of the intermix formula in lieu of the 1920 cc. of Example I. Following the procedure of Example I, the composition that was produced was ready for application to a clear plastic support to obtain a lithographic print receptive surface.

EXAMPLE III

Example I was again repeated except that the intermix produced by admixing 800 cc. of the lower acrylic ester/vinyl ester copolymer (Rhoplex WN–80), 1000 cc. of the titanium dioxide paste produced as in Example I and 520 cc. of the interpolymer dispersion Rhoplex B–15. Again, after following the procedure of Example I, a composition was produced which was ready for application to a plastic base or support to provide a lithographic print receptive surface.

EXAMPLE IV

Example I was again repeated except that the intermix formula was prepared by admixing 1120 cc. of a lower acrylic ester/vinyl ester copolymer (Rhoplex WN–80) and a titanium dioxide paste produced as in Example I in an amount of 900 cc. Again, the results obtained were essentially the same as in Example I.

EXAMPLE V

The composition produced in Example I was utilized to provide a white acrylic blanket coating on a styrene sheet. By utilizing coating speeds, varying from 10 feet per minute to 100 feet per minute in a pan-dip coating process, the coating composition provides a coating of 20 to 30 feet per minute when the system is heated to 100 to 110° F. throughout the coating operation. At such a rate, a coating of approximately 1–5 microns in thickness is produced after drying. After the styrene sheet containing the white acrylic blanket is cut to size to receive the lithographic print, the individual coated blanks are printed with a two-color lithographic print, by the utilization of a conventional two-color lithographic printing apparatus.

A visual examination of the print so obtained indicates that the print has exceptional clarity, brilliance and fidelity of reproduction. Such a print when lit from behind in an advertising display with one fluorescent light, creates an unusually realistic dimensional effect while maintaining integrity of color and clarity of reproduced image.

EXAMPLE VI

A further amount of the composition prepared in Example I was coated on a styrene sheet in an airknife operation so as to produce a white acrylic blanket having a thickness of approximately 1–5 microns. The blank produced after cutting the coated sheet to appropriate size was then imprinted with a two-color lithographic print in the same manner as described in Example V above. Here, however, after imprinting the blank with the two-color lithographic print the white acrylic blanket was stripped from the styrene support so as to form a self-supporting product having the lithographic print thereon.

Again, when such print was viewed visually, the print appeared extremely clear, brilliant, and with high color fidelity and integrity. Such a self-supporting product is useful as a placemat or similar decorative item.

EXAMPLE VII

Example I is again repeated except that in lieu of the interpolymer dispersion employed to provide a paste of the titanium dioxide, substantially equivalent amounts of dispersions of the following interpolymers are utilized:

(A) acrylic acid/propyl acrylate/acrylonitrile (2:1)
(B) methacrylic acid/isobutylacrylate/methylmethacrylate (1:1)
(C) acrylic acid/2-ethylhexylacrylate/styrene (2:1)
(D) methacrylic acid/dodecyl acrylate/methylmethacrylate (1:2)
(E) acrylic acid/isopropylacrylate/methacrylonitrile (6:1)
(F) acrylic acid/ethylacrylate/styrene (3:1)
(G) methacrylic acid/butylacrylate/methylmethacrylate (1:1)

In all cases the acid is used in an amount of 0.5 to 2.5% of the interpolymer, the ratio of the second and third components being specified in parenthesis above. Substantially equivalent results when compared to Example I are obtained.

EXAMPLE VIII

Some 1280 cc. of interpolymer dispersion-titanium dioxide paste produced in Example I were mixed with 2560 cc. of a lower acrylic ester/vinyl ester copolymer (Rhoplex WN–80) and 960 cc. of an interpolymer dispersion (B–15) comprising a nonionic surface active agent and an interpolymer of a methacrylate acid, methacrylate, and methylmethacrylate to form an intermix formula.

A gelatin emulsion was prepared by mixing 4800 cc. of water and 320 g. of gelatin, the gelatin being mixed with the cold water and allowed to expand for one-half hour. The gelatin emulsion was then heated to 140° F. with cooling to 110° F. and subsequent mixing with such emulsion, 1920 cc. of the intermix formula as prepared above. In addition, 16 cc. of a 40% formaldehyde solution were added and the system mixed well and heated again at 110° F. After filtering the composition with a fine filter cloth, the composition that was prepared was ready for coating onto a paper support or base to provide a lithographic print receptive surface.

EXAMPLE IX

Example V was repeated except that the composition produced in Example VIII was utilized to provide a white acrylic blanket on a paper sheet conventionally utilized to receive lithographic prints.

Again, a visual examination of the print obtained indicates exceptional brilliance, clarity and color fidelity.

EXAMPLE X

Example V was again repeated except that the composition of Example I was utilized to coat an aluminum foil sheet of 2 mil thickness instead of the polystyrene sheet.

Again, a print of exceptional fidelity, clarity and brilliance was produced.

EXAMPLE XI

Some 960 cc. of an unpigmented interpolymer dispersion prepared by polymerizing 280 parts of ethylacrylate, 140 parts of methylmethacrylate, and 5.5 parts of methacrylic acid in a solution of 25 parts of an octylphenoxy-polyethoxyethanol having about 30 ether groups in 1000 parts of water were mixed with 1280 cc. of a lower acrylic ester/vinyl ester copolymer (Rhoplex WN–80) and 640 cc. of an interpolymer dispersion (B–15) comprising a nonionic surface active agent and an interpolymer of methacrylate acid, methacrylate, and methylmethacrylate to form an intermix formula.

A gelatin emulsion was prepared by mixing 3840 cc. of water and 256 g. of gelatin, the gelatin being mixed with the cold water and allowed to expand for one-half hour. The gelatin emulsion was then heated to 140° F. with cooling to 110° F. and subsequent mixing with such emulsion, 1920 cc. of the intermix formula as prepared above. In addition, 16 cc. of a 40% formaldehyde solution were added and the system mixed well and heated again at 110° F. After filtering the composition with a fine filter cloth, the composition that was prepared was ready for coating onto a plastic support or base to provide a clear lithographic print receptive surface.

EXAMPLE XII

Example V was repeated employing the clear plastic coating composition produced in accordance with Example XI. Again, when a conventional lithographic process was employed, a brilliant reproducible print of high color fidelity was provided. Such a print upon a clear plastic support has exceptional utility for display purposes in view of the see-through character of the base and coating upon which the print is reproduced.

EXAMPLE XIII

Example X was repeated except that the coating composition was the clear composition produced in accordance with Example XI. Again, a print of exceptional fidelity, clarity and brilliance was produced on the aluminum foil base.

EXAMPLE XIX

Some 1280 cc. of an unpigmented interpolymer dispersion prepared by polymerizing 280 parts of ethylacrylate, 140 parts of methylmethacrylate, and 5.5 parts of methacrylic acid in a solution of 25 parts of an octylphenoxypolyethoxyethanol having about 30 ether groups in 1000 parts of water were mixed with 2560 cc. of a lower acrylic ester/vinyl ester copolymer (Rhoplex WN-80) and 960 cc. of an interpolymer dispersion (B-15) comprising a nonionic surface active agent and an interpolymer of methacrylate acid, methacrylate, and methylmethacrylate to form an intermix formula.

A gelatin emulsion was prepared by mixing 4800 cc. of water and 320 g. of gelatin, the gelatin being mixed with the cold water and allowed to expand for one-half hour. The gelatin emulsion was then heated to 140° F. with cooling to 110° F. and subsequent mixing with such emulsion, 1920 cc. of the intermix formula as prepared above. After filtering the composition with a fine filter cloth, the composition that was prepared was ready for coating onto a paper support or base to provide a clear lithographic print receptive surface.

EXAMPLE XV

Example IX was repeated except that the clear coating composition produced in Example XIX was utilized to provide a receptive coating or blanket on the paper sheet conventionally utilized to receive a lithographic print.

Again, visual examination of the print obtained indicates exceptional brilliance and color fidelity.

Accordingly, it can be seen from the above that the present invention provides an improvement in a coating composition for providing a blank or sheet of material receptive for a lithographic print, such blank or sheet per se, and a process for producing a lithographic print employing such blank or sheet having a white or clear acrylic blanket or coating thereon. The present invention therefore allows for the production of high quality, high clarity, brilliant, high fidelity lithographic prints, in one or more colors upon a support or base particularly plastic, in a manner not heretofore possible.

What is claimed is:

1. A coating composition receptive for a lithographic print for application to a receptive support which comprises:
    (A) 20–70% by weight of water;
    (B) 2–20% by weight of a colloid selected from galatin and other water-permeable colloids; and
    (C) 25–50% by weight of a composition comprising:
        (1) a liquid copolymer of a $C_{1-4}$ alkyl ester of acrylic or methacrylic acid and a vinyl ester, selected from vinyl esters of organic acids selected from aliphatic monocarboxylic acids of up to 18 carbon atoms, aromatic monocarboxylic acids and unsaturated monocarboxylic acids selected from acrylic acid and methacrylic acid; and
        (2) an interpolymer of (a) units having carboxylate groups derived from at least one polymerizable $\alpha,\beta$ unsaturated vinylidene carboxylic acid, (b) units from at least one neutral, free radical polymerizable vinylidene ester which when homopolymerized forms a soft polymer having a Ti value below 15–20° C. and (c) units from at least one neutral, free radical polymerizable vinylidene compound which when homopolymerized yields a hard polymer having a Ti value above 15–20° C., the ratio of units of component (b) to component (c) being between 9:1 and 1:20, and component (a) being present in an amount of about 0.5%–2.5% by weight based on the weight of interpolymer (2), components (1) and (2) being present in amounts of 20–75% by weight and 25–80% by weight respectively based on the total weight of (C).

2. The coating composition of claim 1 wherein said interpolymer is in the form of a paste comprising said interpolymer and a white pigment.

3. The coating composition of claim 2 further including (D) formaldehyde in an amount of 0.0005–0.5% by weight based on the total composition.

4. The composition of claim 2 wherein said colloid is gelatin and said white pigment titanium dioxide.

5. A lithographic receptive blank comprising a receptive support having coated thereon a composition comprising:
    (A) 20–70% by weight of water;
    (B) 2–20% by weight of a colloid selected from gelatin and other water-permeable colloids; and
    (C) 25–50% by weight of a composition comprising:
        (1) a liquid copolymer of a $C_{1-4}$ alkyl ester of acrylic or methacrylic acid and a vinyl ester, selected from vinyl esters of organic acids selected from aliphatic monocarboxylic acids of up to 18 carbon atoms, aromatic monocarboxylic acids and unsaturated monocarboxylic acids selected from acrylic acid and methacrylic acid; and
        (2) an interpolymer of (a) units having carboxylate groups derived from at least one polymerizable $\alpha,\beta$ unsaturated vinylidene carboxylic acids, (b) units from at least one neutral, free radical polymerizable vinylidene ester which when homopolymerized forms a soft polymer having a Ti value below 15–20° C. and (c) units from at least one neutral, free radical polymerizable vinylidene compound which when homopolymerized yields a hard polymer having a Ti value above 15–20° C., the ratio of units of component (b) to component (c) being between 9:1 and 1:20, and component (a) being present in an amount of about 0.5%–2.5% by weight based on the weight of interpolymer (2), components (1) and (2) being present in amounts of 20–75% by weight and 25–80% by weight respectively based on the total weight of (C).

6. The blank of claim 5 wherein said interpolymer is in the form of a paste comprising said interpolymer and a white pigment.

7. The blank of claim 6 wherein said composition further includes (D) formaldehyde in an amount of 0.0005–0.5% by weight based on the total composition.

8. The blank of claim 7 wherein said receptive support comprises plastic, paper or a metal foil.

9. The blank of claim 8 wherein said receptive support is plastic.

10. In a lithographic printing process wherein a blank is printed in one or more colors from a master treated so as to form at least one hydrophilic portion and at least one oleophilic and hydrophobic portion, the improvement which comprises employing a lithographic print receptive blank comprising a support having coated thereon a composition comprising:
(A) 20–70% by weight of water;
(B) 2–20% by weight of a colloid selected from gelatin and other water-permeable colloids; and
(C) 25–50% by weight of a composition comprising:
(1) a liquid copolymer of a $C_{1-4}$ alkyl ester of acrylic or methacrylic acid and a vinyl ester, selected from vinyl esters of organic acids selected from aliphatic monocarboxylic acids of up to 18 carbon atoms, aromatic monocarboxylic acids and unsaturated monocarboxylic acids selected from acrylic acid and methacrylic acid; and
(2) an interpolymer of (a) units having carboxylate groups derived from at least one polymerizable $\alpha,\beta$ unsaturated vinylidene carboxylic acid, (b) units from at least one neutral, free radical polymerizable vinylidene ester which when homopolymerized forms a soft polymer having a Ti value below 15–20° C. and (c) units from at least one neutral, free radical polymerizable vinylidene compound which when homopolymerized yields a hard polymer having a Ti value above 15–20° C. the ratio of units of component (b) to component (c) being between 9:1 and 1:20, and component (a) being present in an amount of about 0.5%–2.5% by weight based on the weight of interpolymer (2), components (1) and (2) being present in amounts of 20–75% by weight and 25–80% by weight respectively based on the total weight of (C).

11. The process of claim 10 wherein said interpolymer is in the form of a paste comprising said interpolymer and a white pigment.

12. The process of claim 11 wherein said composition further includes (D) formaldehyde in an amount of 0.0005–0.5% by weight based on the total composition.

13. The process of claim 12 wherein said support comprises plastic, paper or a metal foil.

14. The process of claim 13 wherein said support is plastic.

15. The coating composition of claim 1 wherein component (a) of interpolymer (2) is selected from acrylic acid, methacrylic acid and water-soluble salts thereof; component (b) is selected from compounds of the formula:

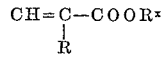

wherein R is hydrogen or a methyl group and $R^x$ represents a primary or secondary alkyl group of 5 to 18 carbon atoms when R is methyl or an alkyl group of up to 18 carbon atoms when R is hydrogen; and component (c) is selected from compounds of the formula:

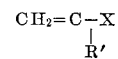

wherein R' is a hydrogen or a methyl group and X represents a group selected from —CN, and —COOR", wherein R" is a cyclohexyl group or a t-alkyl group of 4–5 carbon atoms when R' is hydrogen or a cyclohexyl group or an alkyl group of 1–4 carbon atoms when R' is methyl.

16. The lithographic receptive blank of claim 5 wherein component (a) of interpolymer (2) is selected from acrylic acid, methacrylic acid and water-soluble salts thereof; component (b) is selected from compounds of the formula:

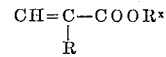

wherein R is hydrogen or a methyl group and $R^x$ represents a primary or secondary alkyl group of 5 to 18 carbon atoms when R is methyl or an alkyl group of up to 18 carbon atoms whern R is hydrogen; and component (c) is selected from compounds of the formula:

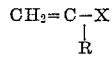

wherein R' is a hydrogen or a methyl group and X represents a group selected from —CN, and —COOR", wherein R" is a cyclohexyl group or a t-alkyl group of 4–5° carbon atoms when R' is hydrogen or a cyclohexyl group or an alkyl group of 1–4 carbon atoms when R' is methyl.

17. The process of claim 10 wherein component (a) of interpolymer (2) is selected from acrylic acid, methacrylic acid and water-soluble salts thereof; component (b) is selected from compounds of the formula:

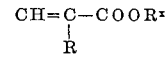

wherein R is hydrogen or a methyl group and $R^x$ represents a primary or secondary alkyl group of 5 to 18 carbon atoms when R is methyl or an alkyl group of up to 18 carbon atoms when R is hydrogen; and component (c) is selected from compounds of the formula:

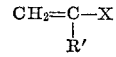

wherein R' is a hydrogen or a methyl group and X represents a group selected from —CN, and —COOR", wherein R" is a cyclohexyl group or a t-alkyl group of 4–5 carbon atoms when R' is hydrogen or a cyclohexyl group or an alkyl group of 1–4 carbon atoms when R' is methyl.

References Cited
UNITED STATES PATENTS

| | | | |
|---|---|---|---|
| 3,365,410 | 1/1968 | Wesslau et al. | 260—901 |
| 2,372,355 | 3/1945 | Champion | 117—35.6 |
| 2,795,564 | 6/1957 | Conn et al. | 260—80.5 |
| 3,016,823 | 1/1962 | Thurlow | 101—462 |
| 3,113,511 | 12/1963 | Dalton | 101—462 |
| 3,256,810 | 6/1966 | Ensink | 101—462 |
| 3,344,741 | 10/1967 | Ormsbee | 101—462 |
| 3,427,971 | 2/1969 | Steber et al. | 117—35.6 |
| 3,431,121 | 3/1969 | Williams | 117—35.6 |
| 3,455,241 | 6/1969 | Perkins | 101—453 |

HAROLD D. ANDERSON, Primary Examiner

E. WOODBERRY, Assistant Examiner

U.S. Cl. X.R.

101—457, 462; 117—35.6, 132, 138.8, 155; 260—29.6, 41

UNITED STATES PATENT OFFICE
CERTIFICATE OF CORRECTION

Patent No. 3,560,417          Dated February 2, 1971

Inventor(s) Philip A. Pizzi

It is certified that error appears in the above-identified patent and that said Letters Patent are hereby corrected as shown below:

Claim 1, (B), "gala-" should be "gela-"

Claim 16, in the second formula, "R" should be "$R^1$"

Claim 16, line 3 from bottom, delete "°" in "4-5°"

Signed and sealed this 11th day of May 1971.

(SEAL)
Attest:

EDWARD M. FLETCHER, JR.
Attesting Officer

WILLIAM E. SCHUYLER, JR.
Commissioner of Patents